United States Patent [19]
Tyson et al.

[11] Patent Number: 5,983,754
[45] Date of Patent: Nov. 16, 1999

[54] SPLIT SPACER FOR A DIFFERENTIAL ASSEMBLY

[75] Inventors: Mark V. Tyson, Newport Beach; Valentine Cucu, Huntington Beach, both of Calif.

[73] Assignee: Vehicular Technologies, Inc., Costa Mesa, Calif.

[21] Appl. No.: 09/079,412

[22] Filed: May 13, 1998

[51] Int. Cl.[6] .................................................. F16H 48/12
[52] U.S. Cl. .......................................... 74/650; 475/252
[58] Field of Search ...................... 74/650; 475/248–252

[56] References Cited

U.S. PATENT DOCUMENTS

| | | | |
|---|---|---|---|
| 4,491,035 | 1/1985 | Gleasman et al. | 475/252 X |
| 4,495,835 | 1/1985 | Gleasman et al. | 475/252 X |
| 5,603,246 | 2/1997 | Zentmyer. | |

*Primary Examiner*—Khoi Q. Ta
*Attorney, Agent, or Firm*—Blakely, Sokoloff, Taylor & Zafman LLP

[57] ABSTRACT

A differential assembly which has a split spacer assembly. The spacer assembly aligns a drive member with a coupler member. The coupler member may be attached to a drive wheel axle. The drive member may be coupled to a case which has an outer ring gear. The ring gear may be coupled to a drive shaft. The split spacer assembly includes a first spacer part that is attached to the coupler member and a second spacer part that is coupled to the drive member and the first spacer part. The split spacer provides clear access for machining the teeth on the coupler members with rotary cutters, and allows the design of thicker drive members for maximum structural integrity while allowing the positioning of the C clip retaining the axle as required by the particular preexisting differential.

10 Claims, 6 Drawing Sheets

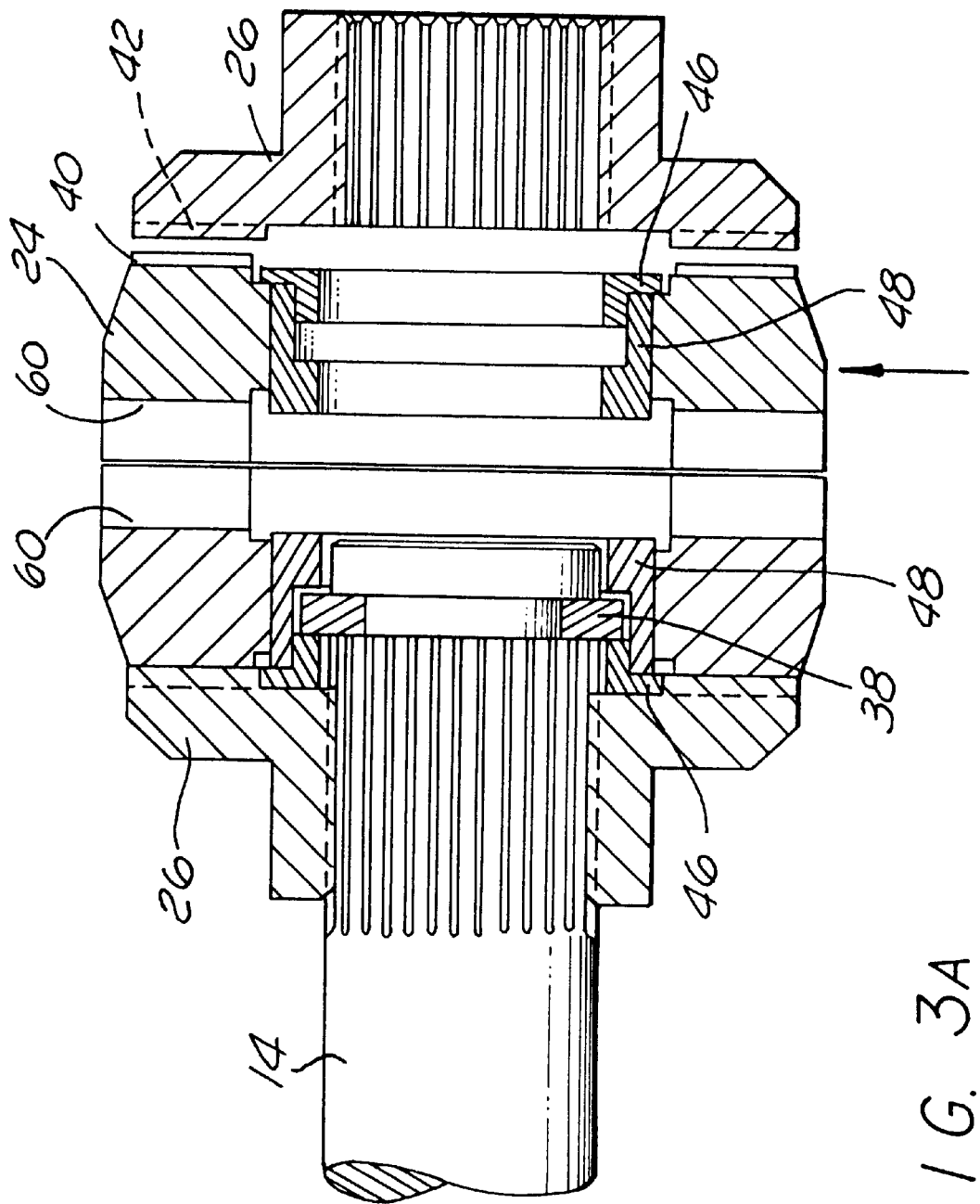

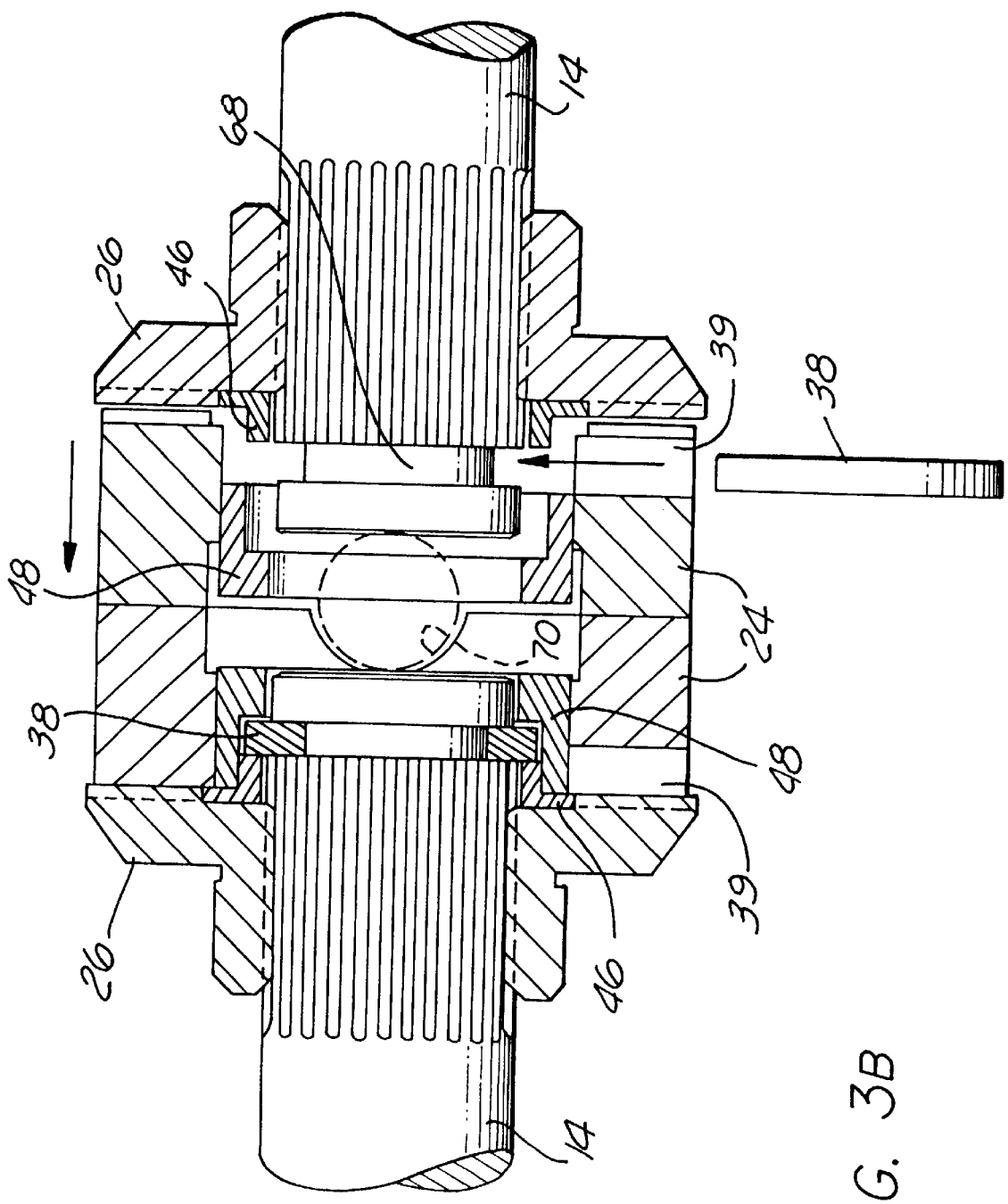
F I G. 3B

5,983,754

SPLIT SPACER FOR A DIFFERENTIAL ASSEMBLY

BACKGROUND OF THE INVENTION

1. FIELD OF THE INVENTION

The present invention relates to differential assemblies for vehicles such as automobiles.

2. BACKGROUND INFORMATION

Automobiles include differential assemblies to compensate for different wheel speeds when the vehicle moves in a non-linear path. For example, when an automobile is turning to the left or right, the radially inward wheels rotate at a speed that is lower than the speed of the outer wheels. The differential assembly allows different rotational speeds of the drive wheels when the vehicle is in a turn.

There have been developed various types of differential member assemblies including a product sold by Vehicular Technologies, Inc. of Costa Mesa, Calif. under the trademark "Performance Locker" for improving traction. The Performance Locker automatic positive-locking differential fits within a differential case and couples to the drive axles of the vehicle, the differential case having a ring member fastened thereto driven in rotation by a pinion member on the drive shaft of the vehicle. The Performance Locker differential includes a pair of drive members that engage a pair of coupler members through facing, inclined teeth. The coupler members are attached to the wheel axles. The drive members are coupled for rotation by the differential case by the differential pinion pin. Rotation of the vehicle drive shaft is translated to the wheel axles through the ring gear, case, pinion pin, drive members and mating coupler members.

The pinion pin loosely fits within a pair of grooves in the side of each drive member opposite the inclined teeth. The grooves have inclined sides, with a width that is greater than the diameter of the pinion pin. When the vehicle is being powered or braked by the vehicle engine, the pinion pin will be rotated about an axis perpendicular to the axis of the pinion pin to engage and drive one, or both (particularly when the drive wheels of the vehicle are on a slippery or soft surface) drive members to transfer the torque of the drive member to the respective coupler member. When the vehicle proceeds around a curve, one of the drive wheels rotates at a different speed than the other wheel. The different speed initially causes the drive member associated with the faster wheel, if the engine is powering the vehicle, or the slower wheel if the engine is retarding the vehicle, to rotate away from contact with the pinion pin. This allows the drive member to move axially away from the respective coupler member if so encouraged.

The drive and coupler members each have inclined teeth on the adjacent faces thereof. When the edges of the grooves in a drive member move away from the pinion pin within the limit of rotation of one drive member with respect to the other drive member, the drive member teeth climb and slide over the respective coupler member teeth so that the wheels can rotate at different speeds. Springs in the assembly bias each drive member into full engagement with the respective coupler member when the teeth on the drive member and coupler member realign.

Each coupler member may be attached to a respective drive wheel axle by a C clip. Each coupler member may have an annular lip that supports the C clip. The annular lip can extend away from the face of the coupler member a distance that is greater than the height of the coupler teeth. The existence of the annular lip increases the complexity and the cost of manufacture of the coupler members because it potentially interferes with use of rotary cutters cutting the coupler teeth. Also to the extent that the annular lip extends away from the face of the coupler member a distance that is greater than the height of the coupler teeth, clearance must be provided in the face of the drive members for the protrusion on the coupler member to pass during assembly, weakening the drive members and reducing their reliability. Therefore it would be desirable to provide a differential assembly that has a greater strength and lower production cost than the assembly described in the background of this application.

SUMMARY OF THE INVENTION

One embodiment of the present invention is a differential assembly which has a split spacer assembly. The spacer assembly aligns a drive member with a coupler member. The coupler member may be attached to a wheel axle. The drive member may be coupled to a case which has an outer ring gear. The ring gear may be coupled to a drive shaft. The split spacer assembly includes a first spacer part that is attached to the coupler member and a second spacer part that is coupled to the drive member and the first spacer part. The split spacer provides clear access for machining the teeth on the coupler members with rotary cutters, and allows the design of thicker drive members for maximum structural integrity and still providing the necessary clearance for assembly.

BRIEF DESCRIPTION OF THE DRAWINGS

FIGS. 3A and 3B are partial cross-sectional views illustrating the assembly of a locking differential using the present invention;

DETAILED DESCRIPTION OF THE INVENTION

One embodiment of the present invention is a differential assembly which includes split spacer assemblies. Each spacer assembly aligns a drive member with a coupler member. The coupler member may be attached to a drive wheel axle. The drive member may be coupled to a differential case having a ring gear attached thereto. The ring gear may be driven in rotation by a pinion gear on the end of a drive shaft. The split spacer assembly includes a first spacer part that is retained by a coupler member and a second spacer part that is located within a drive member and concentric with and sliding over the first spacer part. The first spacer part provides a support surface for a fastener (C clip) that retains the wheel axle relative to the coupler member. By providing a separate spacer part, the teeth of the coupler member can be machined without interference from an annular rim found in coupler members of the prior art. Also, during assembly, the first and second spacer parts may be located within a drive member and not protruding significantly, if at all, axially beyond the tops of the teeth on the drive member so as to allow a drive member to slide over the respective coupler member as if the spacer protrusion for the C clip support surface was not present.

Figure 1:
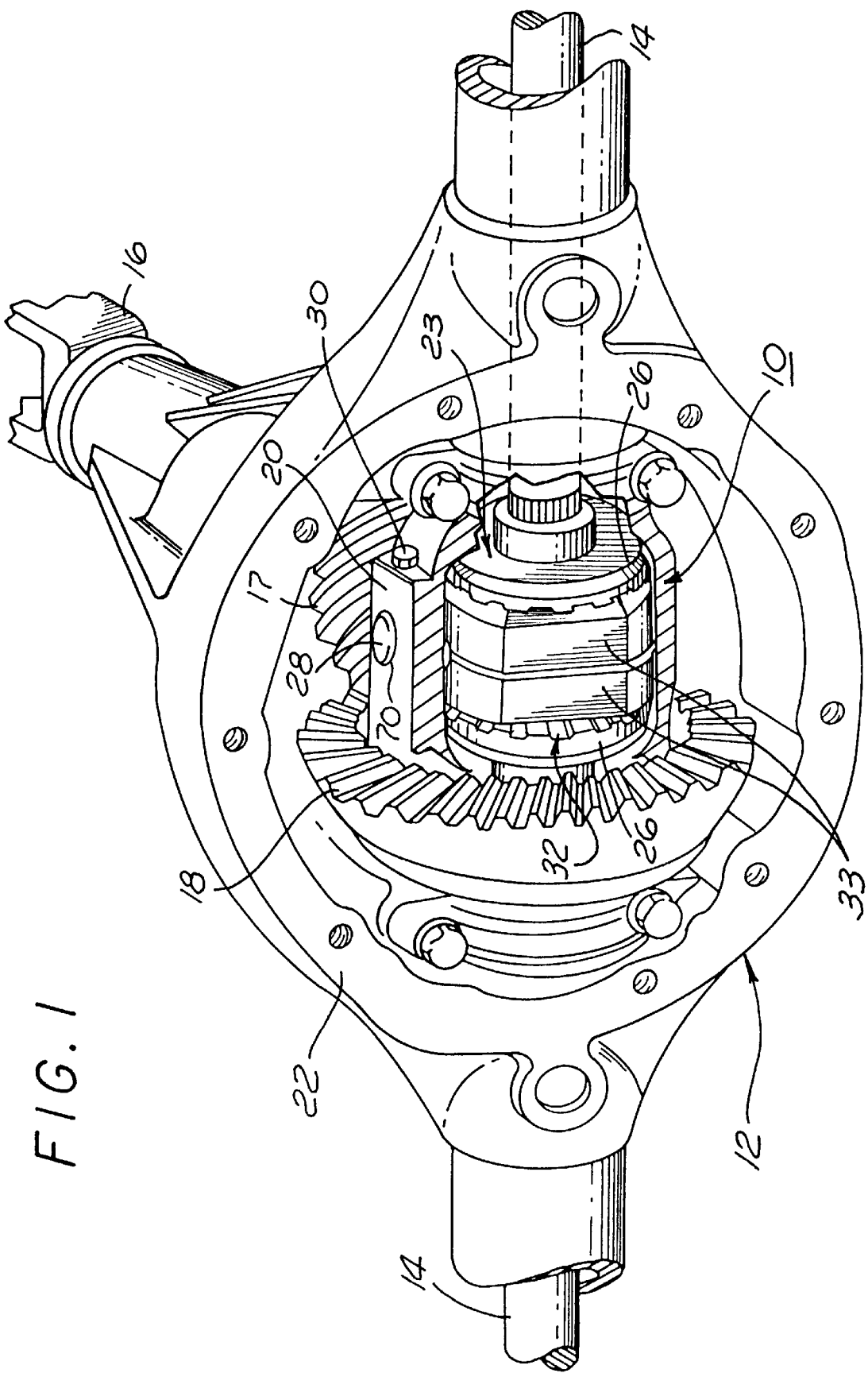
FIG. 1 is a perspective view of an embodiment of a differential assembly of the present invention.

Referring to the drawings more particularly by reference numbers, FIG. 1 shows an embodiment of a differential assembly 10 of the present invention. The differential assembly 10 pictured may be part of a rear drive train assembly 12 that is assembled into a vehicle such as an automobile. The rear drive train assembly 12 couples a pair of drive wheel axles 14 to a drive shaft 16. The rear drive train assembly 12 translates the rotation of the drive shaft 16 into a corresponding rotation of the wheel axles 14 and the wheels of the vehicle.

The rear portion of the drive shaft 16 may have a gear 17 in engagement with a ring gear 18. The ring gear 18 is attached to a differential case 20, with the ring gear 18 and case 20 being enclosed by a housing 22. Rotation of the drive shaft 16 rotates the ring gear 18 and causes the case 20 to spin about the center axis of axles 14. In FIG. 1, the differential case is shown in cross section adjacent the opening in the case to better illustrate the internal assembly, as typically the actual opening in the case is much more restrictive than suggested by FIG. 1.

The case 20 has an inner cavity 23 which contains a pair of drive members 24 that are mated to a pair of coupler members 26. The drive wheel axles 14 are retained by a C clip (to be described) relative to the coupler members 26 and the pinion pin 28. The drive members 24 are secured in rotation relative to the case 20 by the pinion pin 28 so that rotation of the case 20 causes an associated rotation of the drive members 24 as trapped between the pinion pin and the associated coupler member. When the opposing teeth on members 24 and 26 are mated and the pinion pin is driving against the drive members 24, rotation of the drive members induce a corresponding rotation of the coupler members 26 and the wheel axles 14. The pinion pin 28 itself is retained relative to the case 20 by fastener 30.

Figure 2:
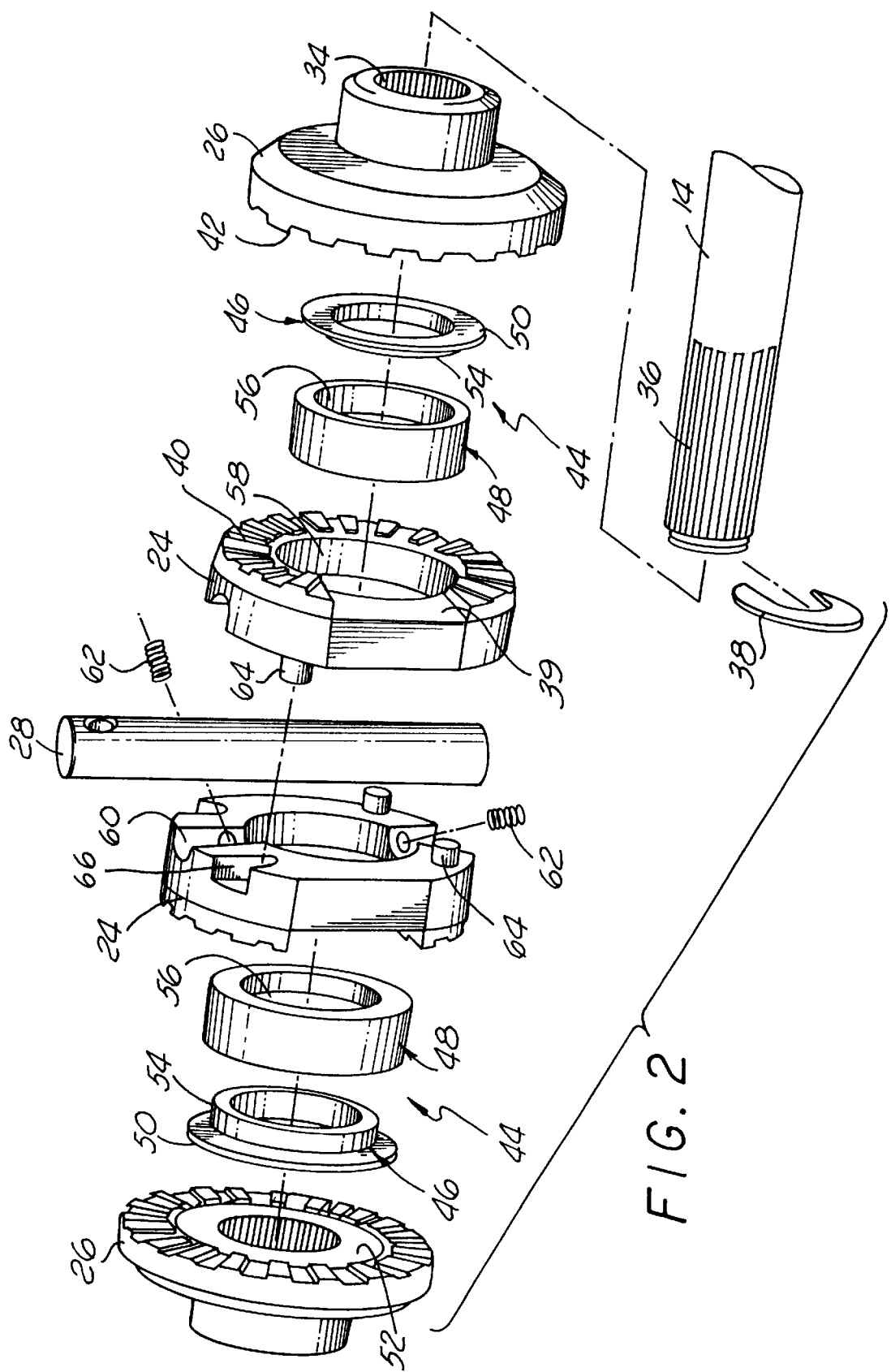
FIG. 2 is an exploded view of the assembly of FIG. 1.

FIG. 2 shows various components of the differential assembly 10. The coupler members 26 each include a center splined bore 34 that receives a corresponding splined end 36 of a drive wheel axle 14. Each wheel axle 14 is secured relative to a coupler member 26 by a C clip 38. Each drive member 24, or at least one drive member 24, has a slot 39 which allows a C clip 38 to be inserted onto a wheel axle 14 in a manner yet to be described.

Each drive member 24 has a plurality of inclined teeth 40 that can mate with corresponding teeth 42 of a coupler member 26. The assembly 10 further has a pair of spacer assemblies 44 which align the drive members 24 with the coupler members 26. Each spacer assembly 44 includes a first spacer part 46 and a second spacer part 48. Each first spacer part 46 may have a base 50 that mates with a face 52 of a coupler member 26 and an annular ring 54 which extends into a center opening 56 of the second spacer part 48. Each second spacer part 48 may extend into a center opening 58 of a drive member 24.

Pinion pin 28 loosely fits within a pair of grooves 60 in the backface of the drive members 24. The assembly 10 may further have springs 62 which bias the drive members 24 away from each other and toward the coupler members 26. The drive members themselves each have a pair of pins 64 and a pair slots 66 in their opposing faces so that the two drive members may slide laterally over each other, but with limited angular rotation with respect to each other. The grooves 60 in the drive members are larger than the pin 28 and have inclined sides so that the pinion pin may be driven in rotation about an axis perpendicular to the axis of the pinion pin by the differential case so as to engage edges of the groove in one or both drive members to force one or both drive members against the respective coupler member to retain the teeth in engagement and drive the same in rotation.

When the axles rotate at different speeds, as in a curve, the pinion pin 28 rotates somewhat away from the edges of the groove in one of the drive members 24 to the limit of the drive member's rotation relative to the other drive member. Since the teeth 40 and 42 are inclined, the teeth 40 on that drive member can now climb and slip past the coupler member teeth 42 to allow differential movement between the wheel axles 14. The springs 62 push the drive member 24 back into engagement with the coupler member 26 whenever the teeth line up for reengagement. The operation is further discussed in U.S. application Ser. No. 08/962,235 filed on Oct. 31, 1997, now U.S. Pat. No. 5,901,618, assigned to the same assignee of the present invention, and hereby incorporated by reference.

Referring again to FIG. 1, differential cases have an opening 32 to allow assembly and disassembly of the cluster gears normally mounted on the axle ends and the pinion pin. In a typical locking differential with which the present invention is preferably used, the drive members 24 may, for strength reasons, have a major diameter that is greater than the opening 32 in the differential case. Thus each drive member 24 may have a pair of opposing flat faces 33 that allow the members 24 to be installed into the inner cavity 23 through the opening 32. Note that these flat surfaces are ideally positioned on the drive members 90° from the grooves 60 so as to not weaken the drive members in the region of the grooves.

Now referring to FIG. 3A, the assembly of the drive members 24 with the spacer parts 46 and 48 therein may be seen. With the pinion pin 28 removed, the coupler members may be installed through the opening in the differential case 20.

After installing the couplers, the first spacer part 46 (in FIG. 3A, the left side that would be nearest the ring gear 18 side in FIG. 1) may be installed flush against the coupler member, as at this time, there is adequate working room in the case. The associated left axle 14 may be installed with the first C clip 38. Then the left drive member is installed through the opening in the case, most conveniently with spacer part 48 already in the drive member. The spacer part 48 therein is then pushed toward the left over the C clip 38 until seated on spacer part 46 with the spacer part 46 in its final position.

After installing the first drive member and split spacer assembly, the second (right side in FIG. 3A) drive member and split spacer assembly may be installed. Now however, space in the case is highly limited. As shown in FIG. 3A, the left drive member is first pushed to the left and engaged with the teeth on the left coupler member. Now with the spacer parts 46 and 48 mounted in the right side drive member 24 as shown, the right side drive member may be slid into position between the left side drive member 24 and the right side coupler member 26 through the opening in the case.

Note that in this embodiment, the flange on the spacer part 46 has a thickness approximately equal to the height of the teeth on the drive members, and fits within an annular area radially inward of the drive member teeth. Thus as shown in FIG. 3A, the spacer part 46 during this phase of the assembly process will not interfere with the top of the teeth on the coupler member 46. This will be true, independent of the axial length of that spacer part, which is dictated by the ultimate axial position required for the C clip. If however, the spacer part had been an integral part of the coupler member, then a relief like slot 39 (FIG. 2), but angularly aligned with a groove 60 in the drive member, would be required to insert the last drive member through the case opening and at the same time provide clearance for the integral spacer projection on the coupler member. This additional slot, aligned with a groove 60 in the drive member, would weaken the drive member in a critical area thereof. Thus the split spacer allows locating the axial position of the C clip as required for the particular make and model of differential the locking differential is to be installed in, without that location effecting the strength of the drive members in the region of a groove 60 therein, already the smallest thickness of the drive members. Also the split spacer, not being in part integral with the coupler member, allows the use of rotary cutters to cut the coupler member teeth. Of course, the flange on the spacer part 46 of this embodiment may be thicker or thinner as desired, as a thicker flange may be accommodated for by increasing the depth of the annular space in the drive members receiving the flange during the assembly illustrated in FIG. 3B.

Figure 4:
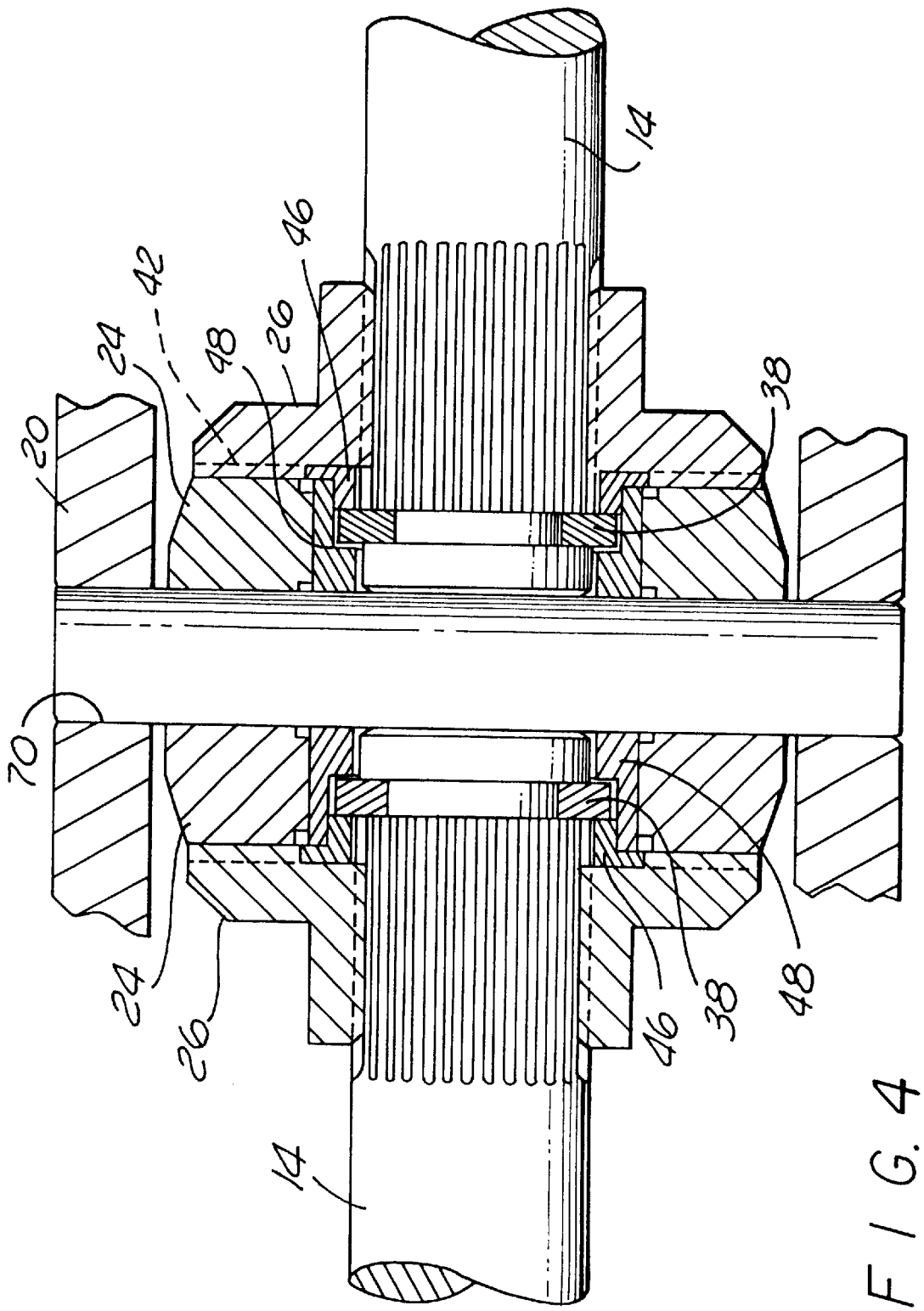
FIG. 4 is a partial side cross-sectional view showing the wheel axle assembled to the gear assembly.

FIG. 3B illustrates the installation of a C clip 38, or the second C clip if the first was previously installed as herein before described. As shown in the Figure, the assembly including the two drive members is first rotated 90° so that slot 39 in the drive member 24 (see also FIG. 2) is accessible through the opening in the differential case 20. Also at this time, since the pinion pin is not in bore 70 in the differential case yet, the right spacer part 48 may be slid to the left as shown in FIG. 3B, and the right axle 14 may be inserted. Actually the axle may be inserted slightly further than its final position for ease in inserting the C clip 38. After installing the C clip, the axle is pulled out as far as it can now go, and the right spacer part 48 is slid to the right over C clip 38 and until seated on coupler 26 (the left axle and left spacer part 48 also being shifted to the left as far as they will go). Finally, as shown in FIG. 4, the pinion pin 28 can then be installed through the bore 70 and locked in position to complete the assembly 10. In the final assembly, the axles are retained from outward movement by the C clips and from inward movement by the ends of the axles contacting the pinion pin.

It should be noted that while the assembly of the pinion pin is the last step in the assembly process described, various other steps as described herein may be done in different order. By way of example, both C clips may be assembled after the coupler members, the drive members, the split spacers and the axles have been placed into the case. Thus, in the claims to follow, the various parts of the method may be practiced in a different order, so that no specific order limitation should be implied by the order set out in any of the claims.

Figure 5:
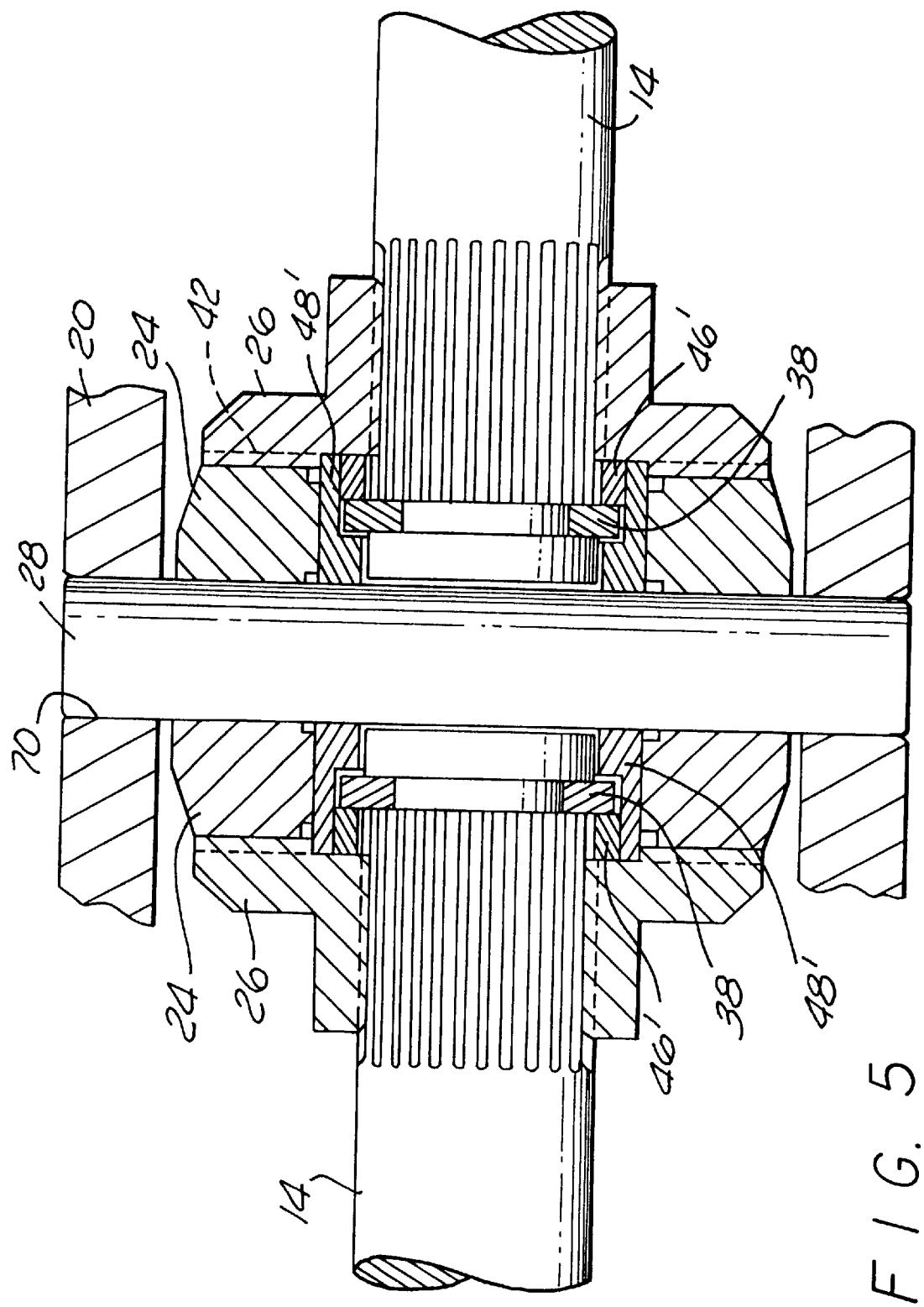
FIG. 5 is a partial side cross-sectional view similar to FIG. 4, but illustrating an alternate exemplary split spacer design.

The foregoing is a description of a preferred embodiment of the present invention. It should be understood, however, that various changes in form and detail may be made therein without departing from the spirit and scope of the invention. By way of example, one alternate form for the spacer parts 46 and 48 is shown in FIG. 5. Here, spacer part 48' is lengthened somewhat so as to axially span the distance between the pinion pin 28 and the coupler 26. Spacer part 46', on the other hand, while having the length as before to properly locate and retain the C clip 38, has the flange removed therefrom so that spacer part 46' will fit within the inner diameter of spacer part 48'. In this way, both spacer parts fit within a driver 24 during assembly, though in general function as herein before described when positioned in the final positions during the assembly.

In general, it is preferred to provide radial location for the spacer parts relative to the couplers 26, as opposed to attempting to radially locate the spacer parts relative to the end of the respective axle 14, as the diameter over the splines on the end of the axle is typically not well controlled. However, while FIG. 5 illustrates the radial location of the spacer part 48' relative to the respective coupler 26 by fitting within the annular region at the radially inward limit of the teeth on the coupler region, and the radial location of spacer part 46' by its slip fit within the inner diameter of spacer part 48', other methods of radial location of these parts may also be used. By way of example, spacer part 46' might be reduced in axial thickness and a corresponding protrusion made integral with coupler 26, so that spacer part 48' fits over the protrusion rather than fitting within the annular region as illustrated in FIG. 5. Radial location of the spacer parts, and particularly spacer part 48', is highly desirable, as the same holds the radial location of drive members 24 to maintain the assembly concentric about the axis of the axles.

In the embodiments described herein, the split spacers are used in both sides of the pinion pin. It should be noted, however, that during the assembly of the various parts through the opening in the differential case, there is substantial room for the various parts during the assembly of the first side, the space only becoming highly limited when attempting to place the second driver in position. Accordingly, referring to FIG. 5 for instance, spacer part 46', or in the previously described embodiment spacer part 46, on one side of the assembly could be an integral part of the corresponding coupler 26, with the split spacer only used in conjunction with the assembly of the second driver. If the split spacer is used only on one side of the assembly, in many differentials it could be used on either side, though preferably it would be used on the side opposite the ring gear to provide more space for manipulating the parts, in some instances avoiding interference with the ring gear which would otherwise occur. However, by using a split spacer on each side of the pinion pin as shown in the embodiments specifically illustrated herein, the number of parts of different design which must be manufactured is reduced and the interchangeability of the parts, side to side, substantially simplifies the assembly instructions and the assembly itself.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A differential assembly, comprising:

a case that has an inner cavity;

an outer ring gear attached to said case;

a coupler member located within said inner cavity of said case;

a drive member that is coupled to said coupler member;

a pinion pin that couples said drive member to said case; and, a split spacer assembly that aligns said drive member with said coupler member, said split spacer assembly having a first spacer part that is attached to said coupler member, and a second spacer part that is coupled to said first spacer part and said drive member.

2. The assembly as recited in claim 1, wherein said first spacer part has an alignment ring which extends into an opening of said second spacer part.

3. The assembly as recited in claim 2, wherein said first spacer part is adjacent to a flat face in said coupler member.

4. The assembly as recited in claim 1, further comprising springs that bias said drive members into said coupler members.

5. A differential assembly for a vehicle which has a pair of wheel axles and a drive shaft, comprising:

a case;

an outer ring gear attached to said case and adapted to be coupled to the drive shaft;

a coupler member adapted to be coupled to the wheel axle;

a drive member that is coupled to said coupler member;

a pinion pin that couples said drive member to said case; and, a part of split spacer assemblies that align said drive members with said coupler members, each split spacer assembly having a first spacer part that is attached to one of said coupler members, and a second spacer part that is coupled to said first spacer part and one of said drive members.

6. The assembly as recited in claim 5, wherein each first spacer part has an alignment ring which extends into an opening of said second spacer part.

7. The assembly as recited in claim 6, wherein each first spacer part is adjacent to a flat face in one of said coupler members.

8. The assembly as recited in claim 1, further comprising a plurality of springs that bias said drive members into said coupler members.

9. A method for assembling a drive member and a coupler member into a case of a differential assembly, wherein the coupler member is attached to a wheel axle, comprising the steps of:

a) mounting a coupler member onto the wheel axle;

b) mounting a first spacer part onto the coupler wheel axle;

c) attaching the first spacer part and the coupler member to the wheel axle;

d) mounting a second spacer part onto the first spacer part;

e) installing a pinion pin into the case to couple the drive member to the case.

10. A method for assembling a drive member and a coupler member into a case of a differential assembly, wherein the coupler member is attached to a wheel axle, comprising the steps of:

a) mounting a coupler member onto the wheel axle;

b) mounting a first spacer part onto the wheel axle;

c) inserting a drive member and a second spacer part into the case;

d) attaching the first spacer part and the coupler member to the wheel axle; and, e) installing a pinion pin into the case to couple the drive member to the case.

\* \* \* \* \*